US012566471B2

(12) United States Patent
Rueblinger et al.

(10) Patent No.: US 12,566,471 B2
(45) Date of Patent: Mar. 3, 2026

(54) ELECTRONIC DOCKING SYSTEM

(71) Applicant: Hand Held Products, Inc., Charlotte, NC (US)

(72) Inventors: Gregory Mark Rueblinger, Stratford, NJ (US); Duane Stephen Roche, Mullica Hill, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 112 days.

(21) Appl. No.: 18/312,314

(22) Filed: May 4, 2023

(65) Prior Publication Data

US 2024/0370054 A1      Nov. 7, 2024

(51) Int. Cl.
*G06F 1/16*          (2006.01)
*H02J 7/00*          (2006.01)

(52) U.S. Cl.
CPC .......... *G06F 1/1632* (2013.01); *H02J 7/0044* (2013.01)

(58) Field of Classification Search
CPC ............. H01R 13/6205; G06K 7/10881; H02J 7/0044; G06F 1/1632
See application file for complete search history.

(56) References Cited

U.S. PATENT DOCUMENTS

| | | | | |
|---|---|---|---|---|
| 8,186,597 B1 * | 5/2012 | Fletcher | ............. | G06K 7/10881 |
| | | | | 235/462.43 |
| 8,662,399 B2 * | 3/2014 | Vassura | ................. | H02J 7/0044 |
| | | | | 235/375 |
| 9,825,476 B2 * | 11/2017 | Mazzone | ................ | H02J 50/10 |
| 2018/0335803 A1 | 11/2018 | Jan et al. | | |
| 2019/0220059 A1 | 7/2019 | Miles et al. | | |
| 2021/0064830 A1 | 3/2021 | Handshaw et al. | | |

FOREIGN PATENT DOCUMENTS

WO          2022/087183 A1      4/2022

OTHER PUBLICATIONS

Extended European Search Report Mailed on Sep. 18, 2024 for EP Application No. 24168285, 14 page(s).
Intention to grant Mailed on Nov. 13, 2025 for EP Application No. 24168285, 6 page(s).

* cited by examiner

*Primary Examiner* — Allen L Parker
*Assistant Examiner* — Elisa Sasserath
(74) *Attorney, Agent, or Firm* — Alston & Bird LLP

(57)          ABSTRACT
In various aspects, an electronic docking system includes a docking device and an electronic device. The electronic device can be configured to be removably attached to the docking device. The docking device can include a first magnetic member and the electronic device can include a second magnetic member. The first magnetic member of the docking device can be configured to move from a first position to a second position.

17 Claims, 4 Drawing Sheets

100

300

200

220

100

300

310

320

211

210

500

230

240

220

200

V

H

300

310

320

500

210

230

240

220

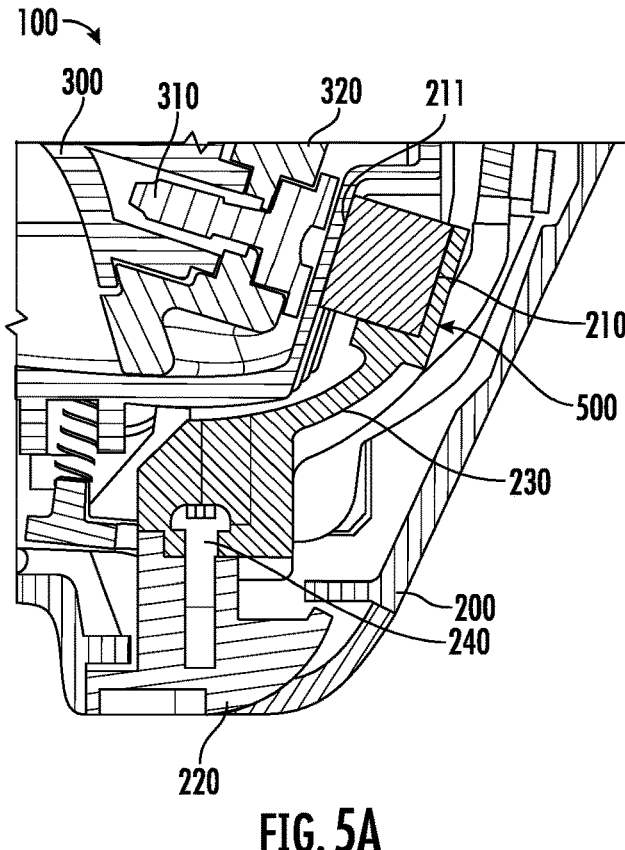
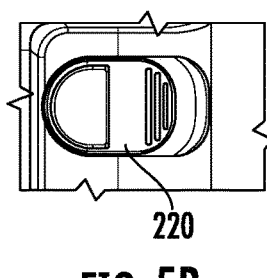
FIG. 5B
FIG. 5A
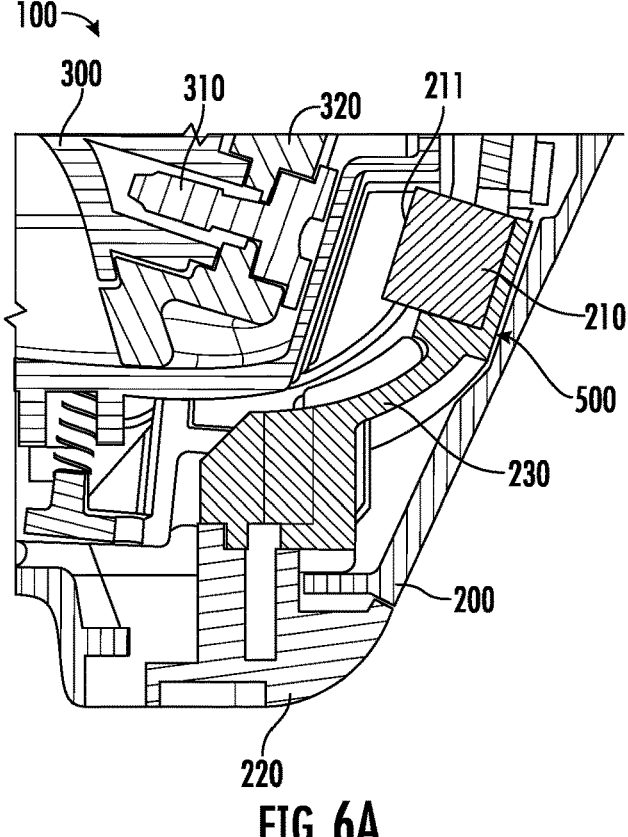
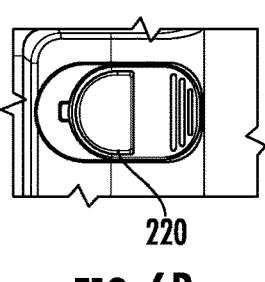
FIG. 6B
FIG. 6A

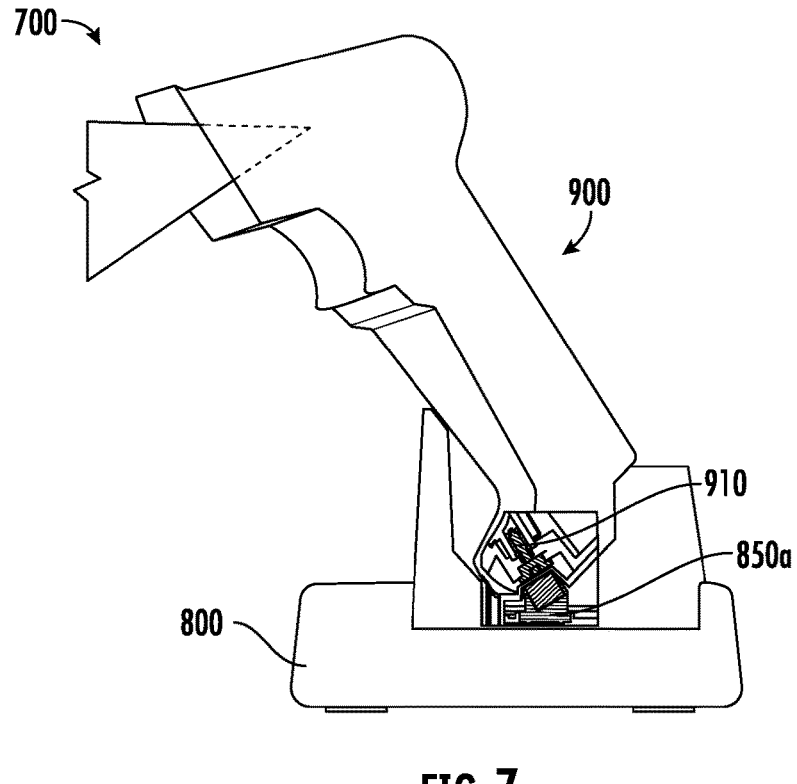
FIG. 7
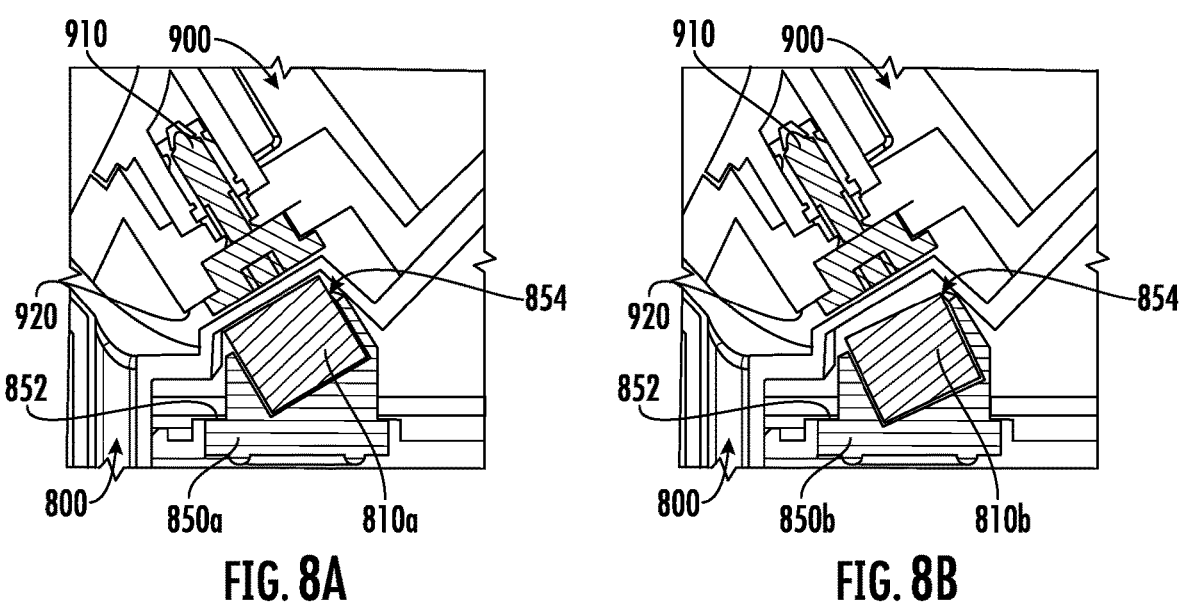
FIG. 8A                   FIG. 8B

ELECTRONIC DOCKING SYSTEM

TECHNICAL FIELD

The present application relates generally to an electronic docking system. More specifically, the present application relates to an electronic docking system that includes an electronic device that can be removably attached to a docking device.

BACKGROUND

Electronic devices are often provided with a docking device, such as a charging base, to hold the electronic device and/or recharge a battery of the electronic device. For some applications for the electronic device, it is desirable to set the docking device on a generally horizontal stationary surface, such as a tabletop or countertop. In other applications for the electronic device, it is desirable to mount the docking device on a generally vertical stationary surface, such as a wall. Yet in other applications for the electronic device, it is desirable to mount the docking device on movable equipment, such as a forklift or a movable workstation.

Because of the various applications for the electronic device, users of the electronic device may want to adjust the force required to detach the electronic device from the docking device based on the current application for the electronic device and/or the location, position, and/or mounting status of the docking device. However, existing technologies in this field do not allow for such adjustment of force required to detach the electronic device from the docking device.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved electronic docking systems. More specifically, embodiments of the electronic docking system of the present disclosure may allow for an adjustment of the force required to detach an electronic device from a docking device.

In various aspects, an electronic docking system includes a docking device and an electronic device. The electronic device can be configured to be removably attached to the docking device. The docking device can include a first magnetic member and the electronic device can include a second magnetic member. The first magnetic member of the docking device can be configured to move from a first position to a second position.

In various examples, the first magnetic member or the second magnetic member includes a ferromagnetic material, and the other of the first magnetic member or the second magnetic member includes a permanent magnet.

In various examples, the ferromagnetic material is a ferrous metal.

In various examples, the docking device includes a switch that is coupled to the first magnetic member. The switch can be configured to move the first magnetic member from the first position to the second position.

In various examples, the first magnetic member of the docking device is configured to translate from the first position to the second position.

In various examples, the first magnetic member of the docking device is configured to pivot from the first position to the second position.

In various examples, the docking device is configured to charge a battery of the electronic device.

In various examples, the electronic device is configured to be in electrical communication with the docking device when the electronic device is coupled to the docking device.

In various examples, the first magnetic member of the docking device is configured to move from the second position to a third position.

In various examples, when the first magnetic member of the docking device is in the first position, a first magnetic force exerted on one of the first magnetic member or the second magnetic member by the other of the first magnetic member or the second magnetic member is at least 5 newton (N) and up to 20 N. When the first magnetic member of the docking device is in the second position, a second magnetic force exerted on one of the first magnetic member or the second magnetic member by the other of the first magnetic member or the second magnetic member can be less than 5 N.

In various aspects, an electronic docking system includes a docking device and an electronic handheld scanner. The electronic handheld scanner can be configured to be removably attached to the docking device. The docking device can be configured to charge a battery of the electronic handheld scanner when the electronic handheld scanner is removably attached to the docking device. The docking device can include a first magnetic member and the electronic handheld scanner can include a second magnetic member. The first magnetic member of the docking device can be configured to move from a first position to a second position.

In various examples, the first magnetic member or the second magnetic member includes a ferromagnetic material, and the other of the first magnetic member or the second magnetic member includes a permanent magnet.

In various examples, the ferromagnetic material is a ferrous metal.

In various examples, the docking device includes a switch that is coupled to the first magnetic member. The switch can be configured to move the first magnetic member from the first position to the second position.

In various examples, the first magnetic member of the docking device is configured to translate from the first position to the second position.

In various examples, the first magnetic member of the docking device is configured to pivot from the first position to the second position.

In various examples, the electronic handheld scanner is configured to be in electrical communication with the docking device when the electronic handheld scanner is coupled to the docking device.

In various examples, the first magnetic member of the docking device is configured to move from the second position to a third position.

In various examples, when the first magnetic member of the docking device is in the first position, a first magnetic force exerted on one of the first magnetic member or the second magnetic member by the other of the first magnetic member or the second magnetic member is at least 5 newton (N) and up to 20 N. When the first magnetic member of the docking device is in the second position, a second magnetic force exerted on one of the first magnetic member or the second magnetic member by the other of the first magnetic member or the second magnetic member can be less than 5 N.

In various examples, the docking device is configured to be coupled to a wall or movable equipment.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
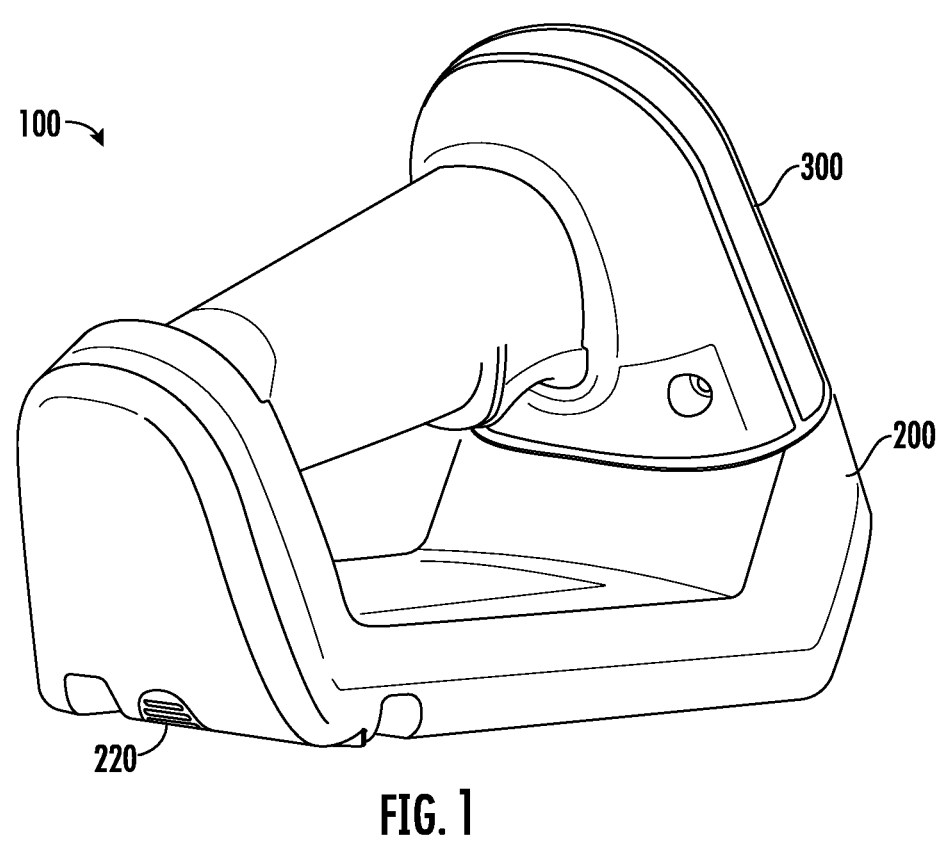

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of an electronic docking system, in accordance with an example embodiment.

Figure 2:
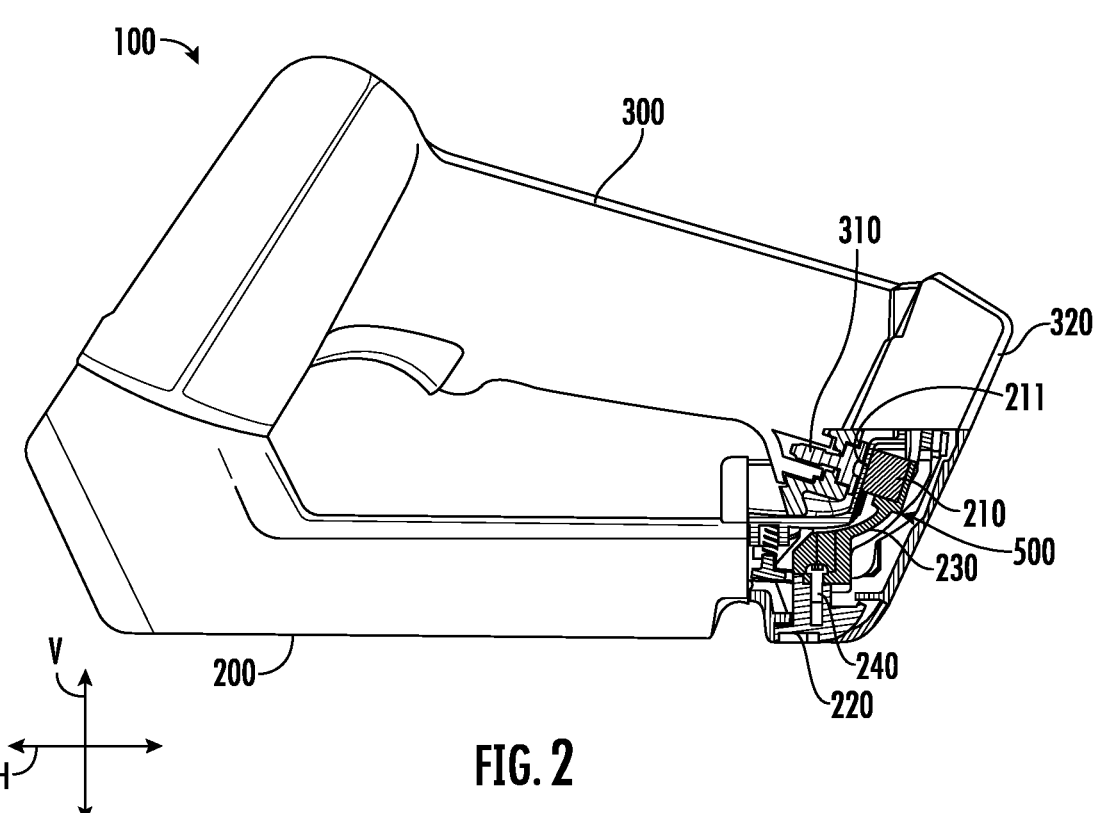

FIG. 2 provides a partial, cross-sectional, side view of the electronic docking system of FIG. 1, in accordance with an example embodiment.

Figure 3:
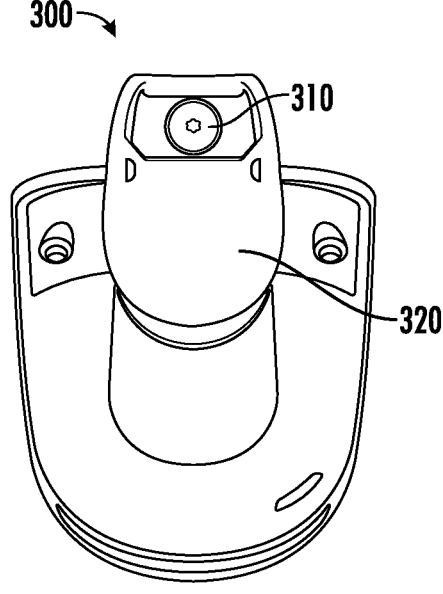

FIG. 3 provides a bottom view of an electronic device of the electronic docking system of claim 1, in accordance with an example embodiment.

Figure 4:
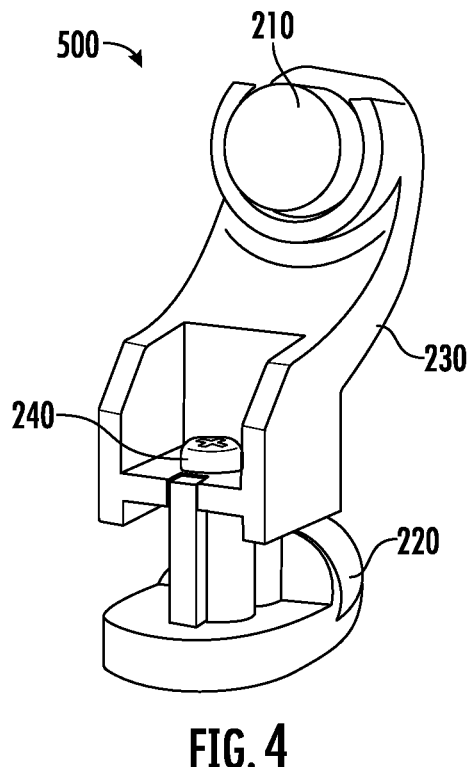

FIG. 4 provides a perspective view of a switch assembly of the electronic docking system of claim 1, in accordance with an example embodiment.

FIG. 5A provides a cross-sectional, side view of a portion of the electronic docking system of claim 1, in accordance with an example embodiment.

FIG. 5B provides a view of a switch of the electronic docking system of claim 1 in a first position, in accordance with an example embodiment.

FIG. 6A provides a cross-sectional, side view of a portion of the electronic docking system of claim 1, in accordance with an example embodiment.

FIG. 6B provides a view of a switch of the electronic docking system of claim 1 in a second position, in accordance with an example embodiment.

FIG. 7 provides a partial, cross-sectional, side view of an electronic docking system, in accordance with an example embodiment.

FIG. 8A provides a cross-sectional, side view of a portion of the electronic docking system of FIG. 7, in accordance with an example embodiment.

FIG. 8B provides a cross-sectional, side view of a portion of the electronic docking system of FIG. 7, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "electrical communication" means that an electric current and/or an electric signal are capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

Referring now to FIG. 1, a perspective view of an electronic docking system 100 is provided, in accordance with an example embodiment. The electronic docking system 100 can include a docking device 200 and an electronic device 300. The electronic device 300 can be removably attached to the docking device 200. As used herein, the term "removably attached" refers to one component, such as the electronic device 300, being capable of being detached from a second component, such as the docking device 200, with a relatively low force, such as the force exerted by a user's hands, and without any tools, such as a screw driver, pry bar, etc., after being attached to the second component.

In various examples, and as depicted in FIG. 1, the electronic device 300 can be an electronic handheld scanner, such as a handheld barcode or quick response code (QR code) scanner. In various example, the electronic device 300 can be a mobile computer. For example, the electronic device 300 can be a handheld computer, a vehicle-mount computer, a tablet, or a wearable computer. In various examples, the electronic device 300 can be a mobile printer.

The docking device 200 can be configured to receive the electronic device 300 so that the electronic device 300 can be removably attached to the docking device 200. The docking device 200 can include alignment features that are configured to mate with corresponding features on the electronic device 300 to align the electronic device 300 when attached to the docking device 200. In various examples, the docking device 200 can be configured to charge a battery of the electronic device 300 or send electrical signals to the electronic device 300 through one or more electrical connections (not depicted). The alignment features may be configured to ensure proper positioning of the electrical connections of the electronic device 300 so that the electrical connections of the electronic device 300 are in electrical communication with electrical connections of the docking device 200 when the electronic device 300 is attached to the docking device 200.

As depicted in FIG. 1, the docking device 200 may extend substantially horizontally so that the electronic device 300 also extends substantially horizontally when removably attached to the docking device 200. In other examples, the docking device 200 may extend substantially vertically and/or the electronic device 300 may extend substantially vertical, as depicted in FIG. 7, when removably attached to the docking device 200. The docking device 200 may be set on (e.g., set on without fastening to) or mounted on (e.g., mounted on with one or more fasteners) a surface, such as a tabletop or countertop. The docking device 200 may be coupled to a stationary surface, such as a tabletop, countertop, or wall. The docking device 200 may be coupled to an object that is movable. For example, the docking device 200 can be coupled to movable equipment, such as a forklift or a movable workstation. In the example of a wearable device, the docking device 200 can be coupled to a user.

The docking device 200 can include a switch 220. As will be discussed further, the switch 220 can be moved to adjust a force required to detach the electronic device 300 from the docking device 200. In the example of FIG. 1, the switch 220 is configured to translate generally in the horizontal direction H (FIG. 2). In other examples, however, the switch 220 is configured to translate in other directions, such as generally in the vertical direction V (FIG. 2), and/or directions between the horizontal direction H and the vertical direction V. In yet other examples, the switch 220 is configured to pivot or rotate.

Referring now to FIG. 2, a partial, cross-sectional, side view of the electronic docking system 100 of FIG. 1 is provided, in accordance with an example embodiment. The docking device 200 can include a first magnetic member 210 and the electronic device 300 can include a second magnetic member 310. The first magnetic member 210, the second magnetic member 310, or both, may be, or include, a magnet. The first magnetic member 210 or the second magnetic member 310, or both, may be, or include, a ferromagnetic material. The first magnetic member 210 can be configured to be magnetically attracted to the second magnetic member 310, and vice-versa.

In various examples, and as depicted in FIG. 2, the first magnetic member 210 is a permanent magnet. For example, the first magnetic member 210 may include a material that is magnetized and generates a magnetic field. In various examples, the first magnetic member 210 is an electromagnet. For example, the first magnetic member 210 may include a coil of wire wrapped around a ferrous core and may generate a magnetic field when electric current flows through the coil.

In various examples, and as depicted in FIG. 2, the second magnetic member 310 includes a ferromagnetic material. For example, the second magnetic member 310 can include iron, cobalt, nickel, neodymium, or a combination thereof. In various examples, the second magnetic member 310 includes a ferrous metal (i.e., a metal that contains iron). For example, the second magnetic member 310 can be steel, which is an alloy that contains iron.

Even though the first magnetic member 210 is depicted and described as a magnet and the second magnetic member 310 is depicted and described as an object that includes a ferromagnetic material, it should be understood that the first magnetic member 210 may be an object that includes a ferromagnetic material and the second magnetic member 310 can be a magnet (e.g., a permanent magnet or an electromagnet). Additionally, in various examples, both the first magnetic member 210 and the second magnetic member 310 may be a magnet (e.g., a permanent magnet and/or an electromagnet).

Referring to FIG. 3, which provides a bottom view of the electronic device 300, in accordance with an example embodiment, the second magnetic member 310 can be a fastener that is manufactured from, or includes, the ferromagnetic material. For example, the second magnetic member 310 can be a fastener, such as a screw, bolt, or rivet, which couples a housing 320, such as an end cap, of the electronic device 300 to another component of the electronic device 300, such as an internal component of the electronic device 300. As depicted in FIG. 3, the second magnetic member 310 may be at least partially exterior to the housing 320 of the electronic device 300. However, in various examples, the second magnetic member 310 is positioned completely within the housing 320 of the electronic device 300.

Referring back to FIG. 2, the docking device 200 can include an arm 230 that is positioned between the first magnetic member 210 and the switch 220. For example, the arm 230 can be coupled or integral with the switch 220. The first magnetic member 210 can be coupled to the arm 230. In various examples, and as depicted in FIG. 2, the arm 230 can be configured to position the first magnetic member 210 so that an inward-facing surface 211 of the first magnetic member 210 extends at approximately a 75 degree angle (e.g., between 70 degrees and 80 degrees) in relation to the horizontal direction H. However, it should be understood that the arm 230 can be configured to position the first magnetic member 210 at any angle.

Referring now to FIG. 4, the docking device 200 can include a switch assembly 500 that can include the switch 220, the arm 230, and the first magnetic member 210. FIG. 4 provides a perspective view of the switch assembly 500, in accordance with an example embodiment. The components of the switch assembly 500 can be firmly coupled to each other such that the switch 220, the arm 230, and the first magnetic member 210 move in unison with each other. In the example of FIG. 4, the arm 230 and the switch 220 are coupled to each other with a fastener 240 (e.g., a screw). In various other examples, the arm 230 and the switch 220 are a unitary component.

Referring now to FIGS. 5A, 5B, 6A, and 6B, views of the switch 220 and the first magnetic member 210 in their respective first positions are provided in FIGS. 5A and 5B, whereas FIGS. 6A and 6B provide views of the switch 220 and the first magnetic member 210 in their respective second positions, in accordance with an example embodiment. More specifically, FIG. 5A provides a partial, cross-sectional, side view of the electronic docking system 100 with the first magnetic member 210 and the switch 220 in their respective first positions; FIG. 5B provides a view of the switch 220 in the first position; FIG. 6A provides a partial, cross-sectional, side view of the electronic docking system 100 with the first magnetic member 210 and the switch 220 in their respective second positions; FIG. 6B provides a view of the switch 220 in the second position.

As discussed, the first magnetic member 210 can be configured to move from a first position, as depicted in FIG. 5A, to a second position, as depicted in FIG. 6A, and vice-versa. When the first magnetic member 210 is in the first position, the first magnetic member 210 may be closer to the second magnetic member 310 than when the first magnetic member 210 is in the second position.

As will be appreciated, the magnetic attraction between the first magnetic member 210 and the second magnetic member 310 may be greater when the first magnetic member 210 is in the first position than in the second position. For example, when the first magnetic member 210 is in the first position, a magnetic force exerted on one of the first magnetic member 210 or the second magnetic member 310 by the other of the first magnetic member 210 or the second magnetic member 310 may be at least 5 newton (N) and up to 20 N, such as at least 8 N and up to 15 N, such as at least 10 N and up to 12 N, such as approximately 11 N, when the electronic device 300 is attached to the docking device 200. When the first magnetic member 210 is in the second position, a magnetic force exerted on one of the first magnetic member 210 or the second magnetic member 310 by the other of the first magnetic member 210 or the second magnetic member 310 may be less than 5 N, such as less than 3 N, such as less than 1 N, when the electronic device 300 is attached to the docking device 200.

In various examples, the first magnetic member 210 can move when the switch 220 is moved. For example, and as depicted, a user can move the switch 220, which moves the arm 230, which moves the first magnetic member 210. In the example of FIGS. 5A-6B, the switch 220 can be translated to translate the first magnetic member 210. In various other examples, the switch 220 can be pivoted to pivot the first magnetic member 210.

In various examples, there are intermediate positions that the first magnetic member 210 and/or the switch 220 can be positioned to. For example, the switch 220 can be configured to move from a first position to a second position, and vice-versa, and from the second position to a third position, and vice-versa, and so forth.

The docking device 200 can include one or more detent features (not depicted) that are each configured to resist the movement of the switch 220 from moving from its current position. For example, the one or more detent features may prevent the switch 220 from moving from its current position when the docking device 200 is tilted. Additionally, the one or more detent features may prevent the switch 220 from moving from its current position when a magnetic force is exerted on the first magnetic member 210 by the second magnetic member 310. The detent features may also provide a tactile or audible "click" when the switch 220 is moved from its current position.

As will be appreciated, the electronic docking system 100 has various benefits. For example, the electronic docking system 100 may have varied use cases. As discussed, the docking device 200 may be set on a surface, coupled to a surface, coupled to movable equipment, etc. In the example where the docking device 200 is set on a surface, the electronic device 300 may not need to be securely attached to the electronic docking system 100 because gravity alone may prevent the electronic device 300 from being detached from the docking system. Additionally, it may be preferred that the electronic device 300 is not securely attached to the electronic docking system 100 so that a user can remove the electronic device 300 from the docking device 200 with one hand and without the docking device 200 moving. However, in the example where the docking device 200 is coupled to movable equipment, such as a forklift or a movable workstation, the electronic device 300 may need to be securely attached to the electronic docking system 100 because the movement of the equipment may undesirably detach the electronic device 300 from the electronic docking system 100.

The electronic docking system 100 of the present disclosure allows for the adjustment of the force required to detach the electronic device 300 from the docking device 200. For example, a user may move the switch 220 of the docking device 200 to a first position to maximize the amount of force required to detach the electronic device 300 from the docking device 200. The user may move the switch 220 of the docking device 200 to a second position to minimize the amount of force required to detach the electronic device 300 from the docking device 200. If it is desired that the force required the detach the electronic device 300 from the docking device 200 is between the minimum and the maximum amount, the user can move the switch 220 to an intermediate position between the first position and the second position.

As will be appreciated by the present disclosure, moving the switch 220 to the first position positions the first magnetic member 210 in a position that is closest to the second magnetic member 310, which maximizes the magnetic force exerted on one of the first magnetic member 210 or the second magnetic member 310 by the other of the first magnetic member 210 or the second magnetic member 310, which may be at least 5 N and up to 20 N. Maximizing the magnetic force exerted on one of the first magnetic member 210 or the second magnetic member 310 by the other of the first magnetic member 210 or the second magnetic member 310 also maximizes the force required to detach the electronic device 300 from the docking device 200 by, for example, a user. Additionally, maximizing the force required to detach the electronic device 300 from the docking device 200 may prevent the electronic device 300 from being undesirably detached from the docking device 200 when, for example, the docking device 200 is coupled to movable equipment or mounted on a wall.

In contrast, moving the switch 220 to the second position positions the first magnetic member 210 in a position that is furthest from the second magnetic member 310, which minimizes the magnetic force exerted on one of the first magnetic member 210 or the second magnetic member 310 by the other of the first magnetic member 210 or the second magnetic member 310, which may be less than 5 N. Minimizing the magnetic force exerted on one of the first magnetic member 210 or the second magnetic member 310 by the other of the first magnetic member 210 or the second magnetic member 310 also minimizes the force required to detach the electronic device 300 from the docking device 200 by, for example, a user. Additionally, minimizing the force required to detach the electronic device 300 from the docking device 200 may allow a user to detach or remove the electronic device 300 from the docking device 200 with one hand when the docking device 200 is placed on, but not mounted to, a horizontal surface, such as a tabletop or countertop.

Referring now to FIG. 7, a side view of an electronic docking system 700 is provided, in accordance with an example embodiment. The electronic docking system 700 can include a docking device 800 and an electronic device 900. The electronic docking system 700, the docking device 800, and/or the electronic device 900 may be configured similarly or the same as the electronic docking system 100, the docking device 200, and/or the electronic device 300 of FIGS. 1-6.

In various examples, the docking device 800 may not include a switch assembly 500. Instead, or in addition to, the docking device 800 may include a first holder 850a. The first holder 850a can be configured to be removably coupled to the docking device 800. As used herein, the term "removably coupled" refers to a first component, such as the first holder 850a, being capable of being decoupled from a second component, such as the docking device 200, with the force exerted by a user's hand, with or without any tools, such as a screw driver, and without any significant damage to the first component or the second component. For example, after the first holder 850a is coupled to the docking device 800, a retaining device (not depicted) may be provided that retains the positioning of the first holder 850a. A tool, such as a screw driver, may be required to remove the retaining device from the docking device 800.

In various examples, the first holder 850a may not be retained by a retaining device. Instead, or in addition to, the first holder 850a may be sized so that an interference fit is formed between the first holder 850a and an orifice 854 (FIGS. 8A, 8B) of the docking device 800 that it is positioned within. In various examples, the first holder 850a can be manufactured from a material that has a high coefficient of friction, such as rubber. Manufacturing the holder 850a with rubber may decrease the likelihood of the holder 850a from being undesirably decoupled from the docking device 800.

Referring now to FIG. 8A, a cross-sectional, side view of a portion of the electronic docking system 700 of FIG. 7 is provided, according to an example embodiment. In various examples, and as depicted in FIG. 8A, the first holder 850a can have a flange 852. The flange 852 can extend completely, or partially, around a periphery of the first holder 850a. As will be explained in more detail, the flange 852 may prevent the first holder 850a from being moved inward (e.g., upward and slightly to the left in the view of FIG. 8A).

The docking device 800 can include a first magnetic member 810a and the electronic device 900 can include a second magnetic member 910. The first magnetic member 810a can be configured the same as, or similarly to, the first magnetic member 210 of the electronic docking system 100 of FIGS. 1-6 and the second magnetic member 910 can be configured the same as, or similarly to, the second magnetic member 310 of the electronic docking system 100 of FIGS. 1-6.

The first magnetic member 810a of the docking device 800 can be configured to be positioned, partially or completely, within an orifice 854 of the first holder 850a. For example, at least half, such as at least three-quarters, such as all of the volume of the first magnetic member 810a can be positioned within the first holder 850a. The first magnetic member 810a can be coupled to the first holder 850a. For example, the first magnetic member 810a can be fastened (e.g., with a screw, bolt, or rivet) or adhered to the first holder 850a with an adhesive.

A magnetic force exerted on one of the first magnetic member 810a or the second magnetic member 910 by the other of the first magnetic member 810a or the second magnetic member 910 may be at least 5 N and up to 20 N, such as at least 8 N and up to 15 N, such as at least 10 N and up to 12 N, such as approximately 11 N, when the electronic device 900 is attached to the docking device 800. When the electronic device 900 is being detached from the docking device 800 by, for example, a user, the flange 852 of the first holder 850a may prevent the first holder 850a and the first magnetic member 810a from being attached, or remaining attached, to the second magnetic member 910 of the electronic device 900 as the electronic device 900 is being positioned away from the docking device 800.

As discussed, the first holder 850a can be removably coupled to the docking device 800. Because the first magnetic member 810a is coupled to the first holder 850a with, for example, an adhesive and/or a fastener, the first magnetic member 810a may also be removably coupled to the docking device 800. Once the first holder 850a and the first magnetic member 810a are removed from the docking device 800, the first holder 850a and the first magnetic member 810a can remain removed or replaced with a second holder 850b (FIG. 8B). As will be discussed further, replacing the first holder 850a with a second holder 850b may increase or reduce a force required to detach the electronic device 900 from the docking device 800.

Referring now to FIG. 8B, a cross-sectional, side view of a portion of the electronic docking system 700 of FIG. 7 is provided, according to an example embodiment. More specifically, FIG. 8B depicts the electronic docking system 700 that includes the second holder 850b removably coupled to the docking device 800, in lieu of the first holder 850a (FIG. 8A). In various examples, and as depicted in FIG. 8B, the second holder 850b may be configured similarly to the first holder 850a. However, the second holder 850b may position the same magnetic member (e.g., the first magnetic member 810a) or a different magnetic member, such as a third magnetic member 810b, at a different position than the first holder 850a. For example, the second holder 850b may be configured to position the first or third magnetic member 810a, 810b further away from the second magnetic member 910 than the first holder 850a. From this point forward, the third magnetic member 810b will often be described as a different magnetic member than the first magnetic member 810a, for simplicity. However, it should be understood that the third magnetic member 810b may be the same magnetic member as the first magnetic member 810a, but positioned within the second holder 850b instead of the first holder 850a. For example, a user could uninstall the first magnetic member 810a from the first holder 850a and install the first magnetic member 810a in the second holder 850b.

In various examples, a magnetic force exerted on one of the third magnetic member 810b or the second magnetic member 910 by the other of the third magnetic member 810*b* or the second magnetic member 910 may be at least 5 N and up to 10 N, such as at least 5 N and up to 8 N when installed in the second holder 850*b* and when the electronic device 900 is removably attached to the docking device 800.

The magnetic force exerted on or exerted by the third magnetic member 810*b* by or on the second magnetic member 910 (e.g., at least 5 N and up to 10 N) may be less than the magnetic force exerted on or exerted by the first magnetic member 810*a* by or on the second magnetic member 910 (e.g., at least 5 N and up to 20 N), when the electronic device 900 is removably attached to the docking device 800. As will be appreciated, the magnetic force is reduced because, as previously discussed, the second holder 850*b* positions the first/third magnetic member 810*a*, 810*b* further away from the second magnetic member 910 when the electronic device 900 is removably attached to the docking device 800.

In various examples, the first/third magnetic member 810*a*, 810*b* can be removed from the docking device 800 so that a magnetic force is not exerted on the second magnetic member 910 by the first/third magnetic member 810*a*, 810*b*. In addition, the respective holder 850*a*, 850*b* that is holding the first/third magnetic member 810*a*, 810*b* may also be removed from the docking device 800.

In various examples, the second holder 850*b* may be the same holder as the first holder 850*a* or a different holder that is configured to position the third magnetic member 810*b* at the same position (or a substantially similar position (e.g., within manufacturing or engineering tolerances)) as the first magnetic member 810*a* when installed in the first holder 850*a*. The third magnetic member 810*b* can be configured as a magnet and can have a magnetic strength that is less than or more than a magnetic strength of the first magnetic member 810*a*, which can also be configured as a magnet. As such, the magnetic force exerted on the second magnetic member 910 may be increased or decreased when the third magnetic member 810*b* is installed within the first/second holder 850*a*, 850*b*.

In various examples, and as described in reference to FIGS. 7-8B, a force required to remove the electronic device 900 from the docking device 800 can be decreased or increased by removing the first holder 850*a* from the docking device 800 and installing either a second holder 850*b* that positions the first/third magnetic member 810*a*, 810*b* at a different position and/or by replacing the first magnetic member 810*a* with a third magnetic member 810*b* that has an increased or decreased magnetic strength.

Even though only two positions for the first/third magnetic member 810*a*, 810*b* have been described, it should be understood that other positions, including intermediate positions, for the first/third magnetic member 810*a*, 810*b* within the first/second holder 850*a*, 850*b* or additional holders, such as a third holder (not depicted), a fourth holder (not depicted), etc., are contemplated. Each of the holders can be interchanged with another holder. For example, the first holder 850*a* can be interchanged with the second holder 850*b*, the third holder, and/or the fourth holder; the second holder 850*b* can be interchanged with the third holder, and/or the fourth holder, and so forth. Interchanging the holders 850*a*, 850*b* may increase or decrease the force required to detach the electronic device 900 from the docking device 800.

Also, even though only two magnetic strengths have been described in relation to the first magnetic member 810*a* and the third magnetic member 810*b*, it should be understood that other magnetic strengths, including intermediate magnetic strengths, are contemplated for the first/third magnetic member 810*a*, 810*b* and/or additional magnetic members, such as a fourth magnetic member (not depicted), a fifth magnetic member (not depicted), etc. For example, the first magnetic member 810*a* can be interchanged with the third magnetic member 810*b*, the fourth magnetic member, and/or the fifth magnetic member. Interchanging the magnetic member may increase or decrease the force required to detach the electronic device 900 from the docking device 800.

As will be appreciated, the electronic docking system 700 has various benefits. Similarly to the electronic docking system 100, as described in reference to FIGS. 1-6, the electronic docking system 700 of FIGS. 7-8B may have varied use cases. For example, the docking device 800 may be set on a surface, coupled to a surface, coupled to movable equipment, etc. Each of these use cases may result in a different preference for an amount of force required to detach the electronic device 900 from the docking device 800.

The electronic docking system 700 of the present disclosure allows for the adjustment of the force required to detach the electronic device 300 from the docking device 200. For example, and as discussed, a user can interchange the magnetic member 810, 810*b* of the docking device 800 and/or interchange the holder 850*a*, 850*b* of the docking device 800 to adjust the force required to detach the electronic device 300 from the docking device 200.

Conclusion

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An electronic docking system comprising:
   a docking device comprising a first magnetic member;
   an electronic device configured to be removably attached to the docking device, wherein the electronic device comprises a second magnetic member; and
   a movable switch that is coupled to the first magnetic member of the docking device, wherein the movable switch is configured to move the first magnetic member of the docking device from a first position to a second position to adjust a force required to detach the electronic device from the docking device, wherein when the first magnetic member of the docking device is in the first position, a first magnetic force exerted on one of the first magnetic member or the second magnetic member by other of the first magnetic member or the second magnetic member is at least 5 newton (N) and up to 20 N, and wherein when the first magnetic member of the docking device is in the second position, a second magnetic force exerted on one of the first magnetic member or the second magnetic member by the other of the first magnetic member or the second magnetic member is less than 5 N.

2. The electronic docking system of claim 1, wherein one of the first magnetic member or the second magnetic member comprises a ferromagnetic material, and other of the first magnetic member or the second magnetic member comprises a permanent magnet.

3. The electronic docking system of claim 2, wherein the ferromagnetic material is a ferrous metal.

4. The electronic docking system of claim 1, wherein the first magnetic member of the docking device is configured to translate from the first position to the second position.

5. The electronic docking system of claim 1, wherein the first magnetic member of the docking device is configured to pivot from the first position to the second position.

6. The electronic docking system of claim 1, wherein the docking device is configured to charge a battery of the electronic device.

7. The electronic docking system of claim 1, wherein the electronic device is configured to be in electrical communication with the docking device when the electronic device is coupled to the docking device.

8. The electronic docking system of claim 1, wherein the movable switch of the docking device is configured to move to an intermediate position, and wherein the intermediate position is between the first position and the second position.

9. An electronic docking system comprising:

a docking device comprising a first magnetic member; and an electronic device configured to be removably attached to the docking device, wherein the electronic device comprises a second magnetic member, wherein the first magnetic member of the docking device is configured to move from a first position to a second position, wherein when the first magnetic member of the docking device is in the first position, a first magnetic force exerted on one of the first magnetic member or the second magnetic member by other of the first magnetic member or the second magnetic member is at least 5 newton (N) and up to 20 N, and wherein when the first magnetic member of the docking device is in the second position, a second magnetic force exerted on one of the first magnetic member or the second magnetic member by the other of the first magnetic member or the second magnetic member is less than 5 N.

10. An electronic docking system comprising:

a docking device comprising a first magnetic member; and an electronic handheld scanner configured to be removably attached to the docking device, wherein the electronic handheld scanner comprises a second magnetic member; and a movable switch coupled to the first magnetic member of the docking device, wherein the docking device is configured to charge a battery of the electronic handheld scanner when the electronic handheld scanner is removably attached to the docking device, wherein the movable switch is configured to move the first magnetic member of the docking device from a first position to a second position to adjust a force required to detach the electronic handheld scanner from the docking device, wherein when the first magnetic member of the docking device is in the first position, a first magnetic force exerted on one of the first magnetic member or the second magnetic member by other of the first magnetic member or the second magnetic member is at least 5 newton (N) and up to 20 N, and wherein when the first magnetic member of the docking device is in the second position, a second magnetic force exerted on one of the first magnetic member or the second magnetic member by the other of the first magnetic member or the second magnetic member is less than 5 N.

11. The electronic docking system of claim 10, wherein one of the first magnetic member or the second magnetic member comprises a ferromagnetic material, and other of the first magnetic member or the second magnetic member comprises a permanent magnet.

12. The electronic docking system of claim 11, wherein the ferromagnetic material is a ferrous metal.

13. The electronic docking system of claim 10, wherein the first magnetic member of the docking device is configured to translate from the first position to the second position.

14. The electronic docking system of claim 10, wherein the first magnetic member of the docking device is configured to pivot from the first position to the second position.

15. The electronic docking system of claim 10, wherein the electronic handheld scanner is configured to be in electrical communication with the docking device when the electronic handheld scanner is coupled to the docking device.

16. The electronic docking system of claim 10, wherein the movable switch of the docking device is configured to move to an intermediate position, and wherein the intermediate position is between the first position and the second position.

17. The electronic docking system of claim 10, wherein the docking device is configured to be coupled to a wall or movable equipment.

* * * * *